United States Patent [19]

Stewart et al.

[11] 4,005,050
[45] Jan. 25, 1977

[54] TANTALUM OR NIOBIUM-MODIFIED RESISTOR ELEMENT

[75] Inventors: Ronald K. Stewart, Mount Clemens; Robert H. Insley, Royal Oak, both of Mich.

[73] Assignee: Champion Spark Plug Company, Toledo, Ohio

[22] Filed: Apr. 19, 1972

[21] Appl. No.: 245,511

[52] U.S. Cl. .................................. 252/521; 106/46
[51] Int. Cl.² ......................................... H01B 1/06
[58] Field of Search ............ 252/518, 521; 106/47, 106/46

[56] References Cited

UNITED STATES PATENTS

| 2,081,894 | 5/1937 | Meyer et al. | 252/518 |
| 2,490,825 | 12/1949 | Mochel | 252/518 |
| 3,044,901 | 7/1962 | Garnsworthy | 252/518 |

*Primary Examiner*—John D. Welsh
*Attorney, Agent, or Firm*—John C. Purdue

[57] ABSTRACT

An improved resistor element especially suitable for use in spark plugs is disclosed. The resistor element is prepared from a stannic oxide-barium, calcium or strontium borate composition doped with from 1 to 18 percent tantalum pentoxide or ½ to 5 percent niobium pentoxide based on the total batch weight. A method for producing the element is also disclosed.

7 Claims, 9 Drawing Figures

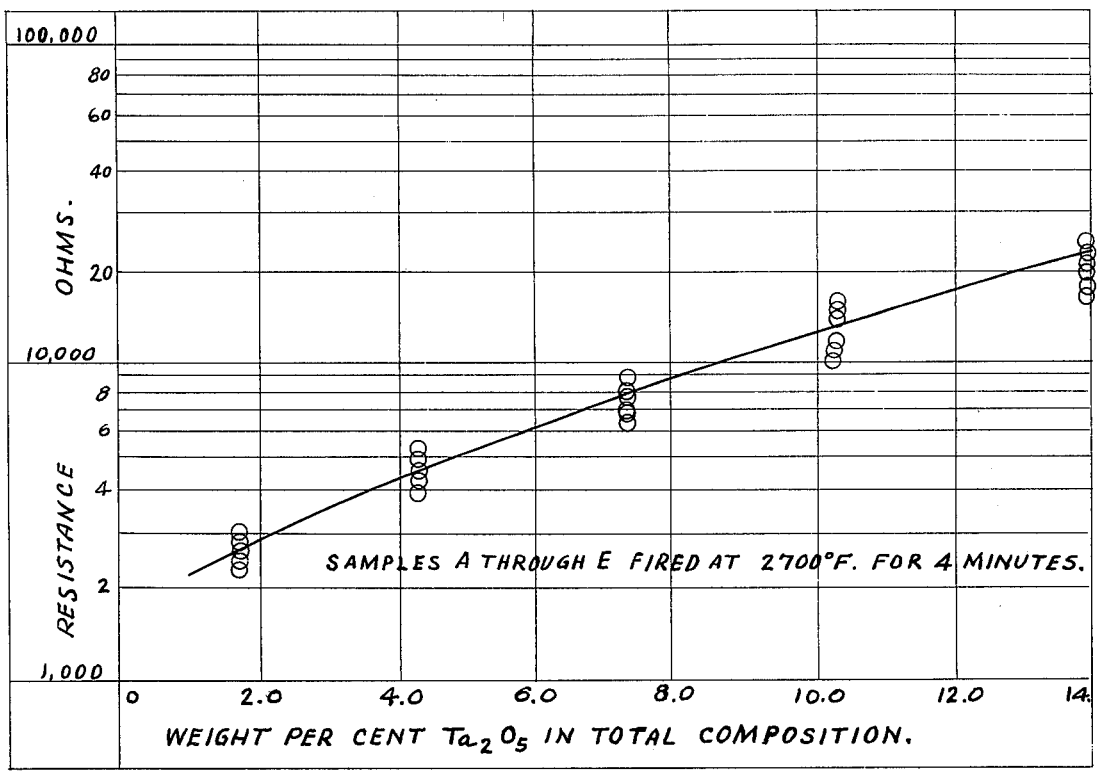
FIG-1-
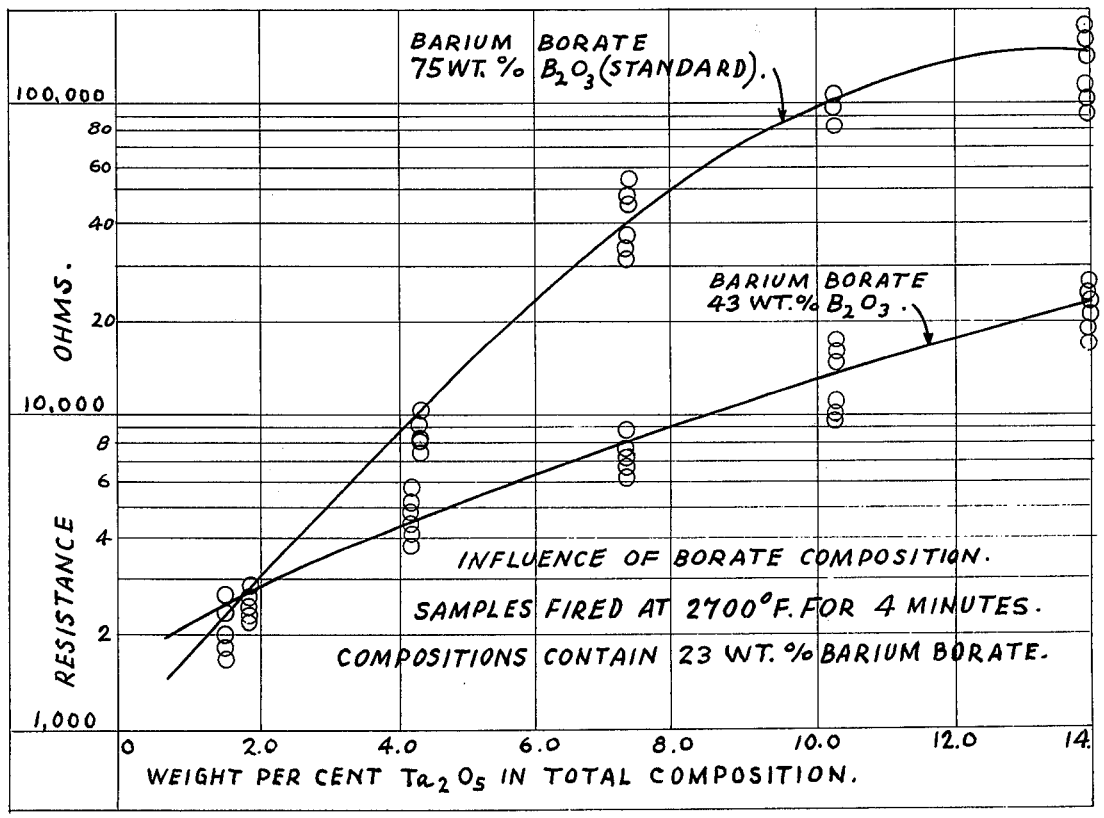
FIG-2-

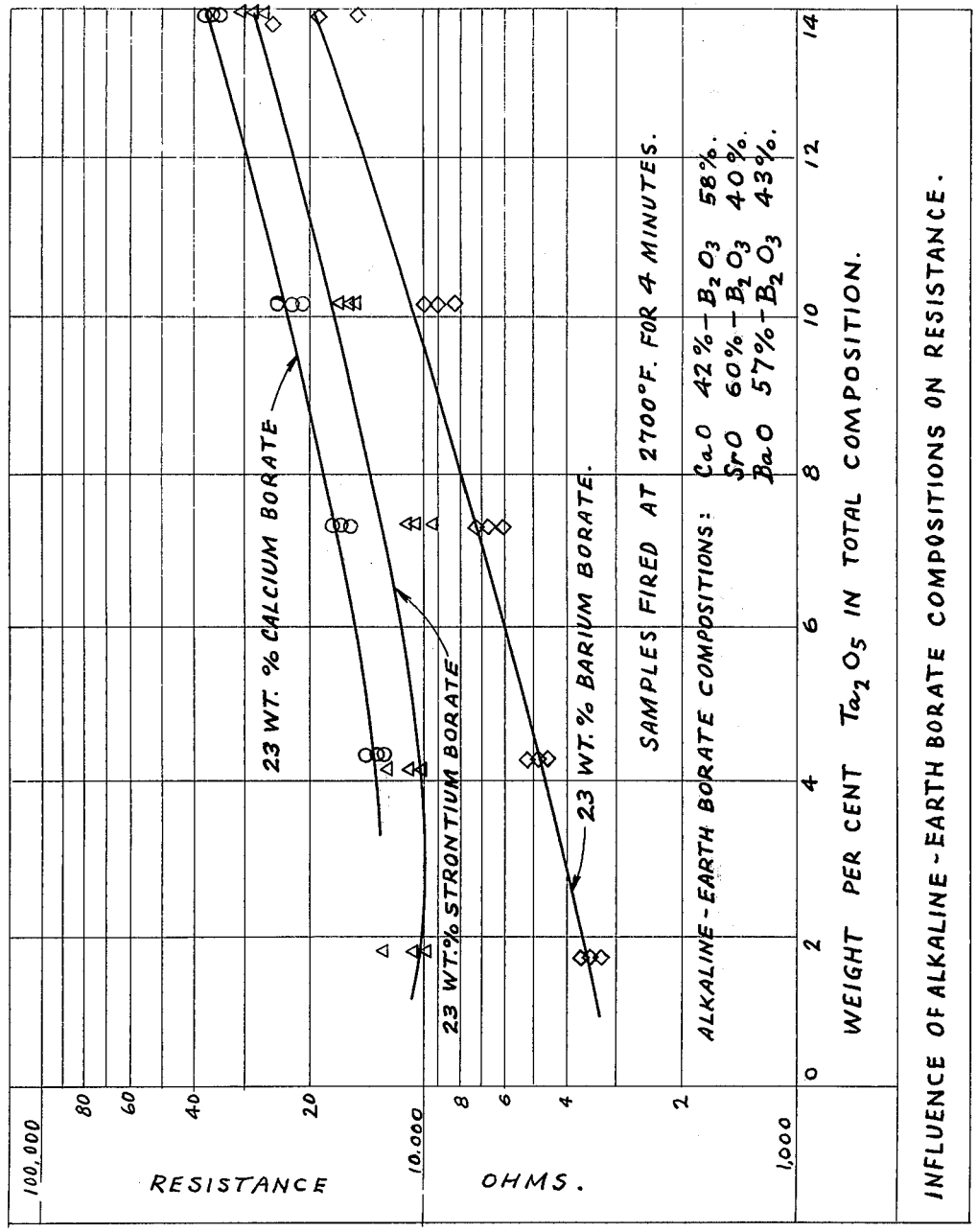
FIG-3 -
INFLUENCE OF ALKALINE-EARTH BORATE COMPOSITIONS ON RESISTANCE.

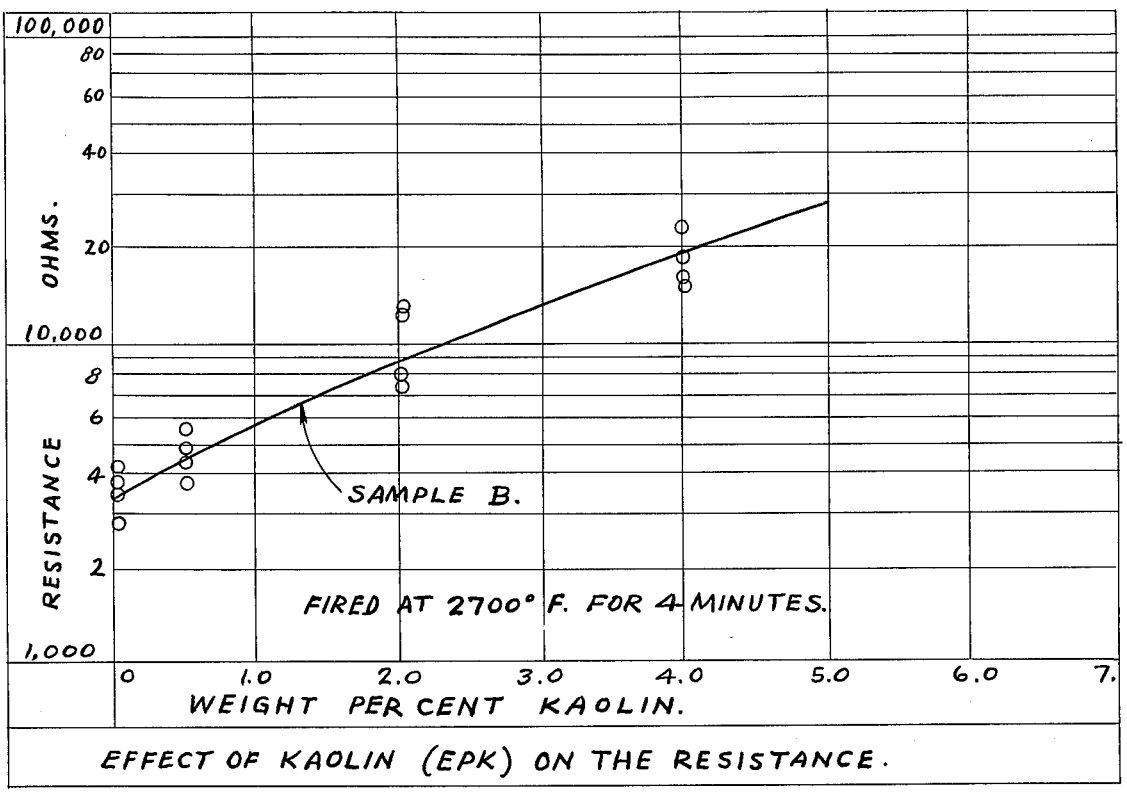
EFFECT OF KAOLIN (EPK) ON THE RESISTANCE.
FIG-4-
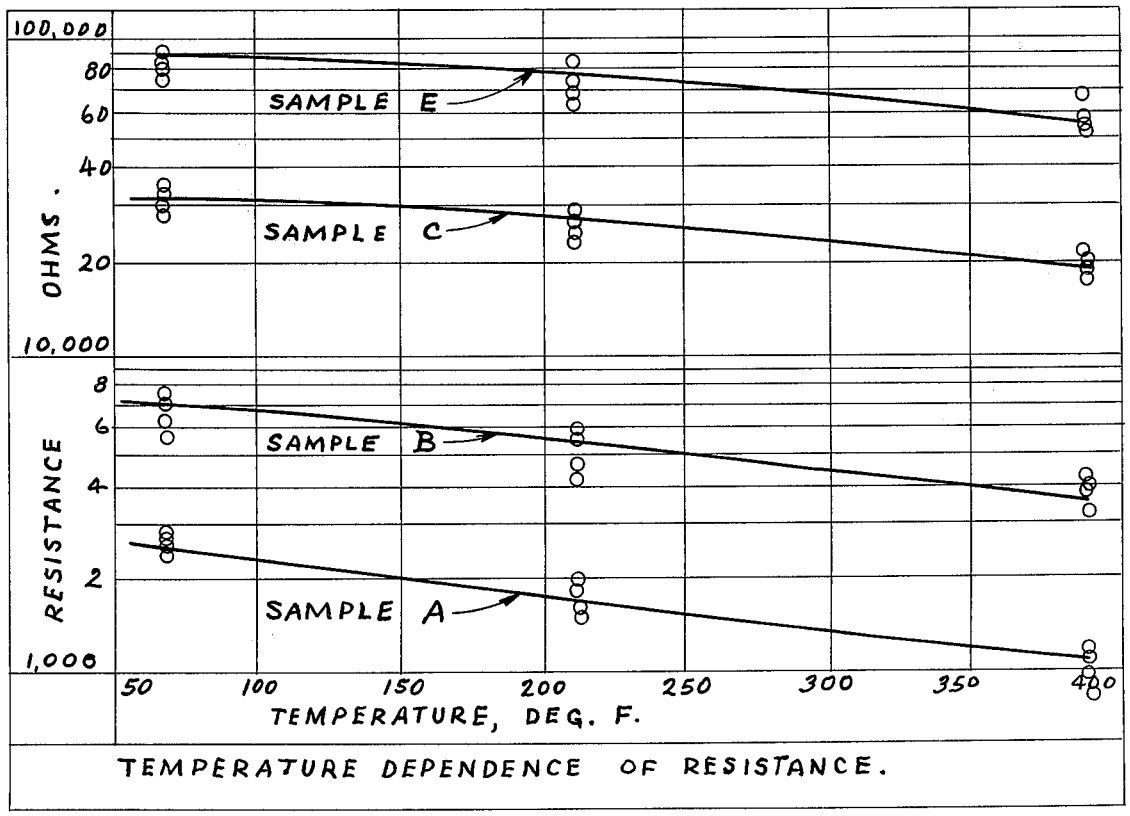
TEMPERATURE DEPENDENCE OF RESISTANCE.
FIG-5-

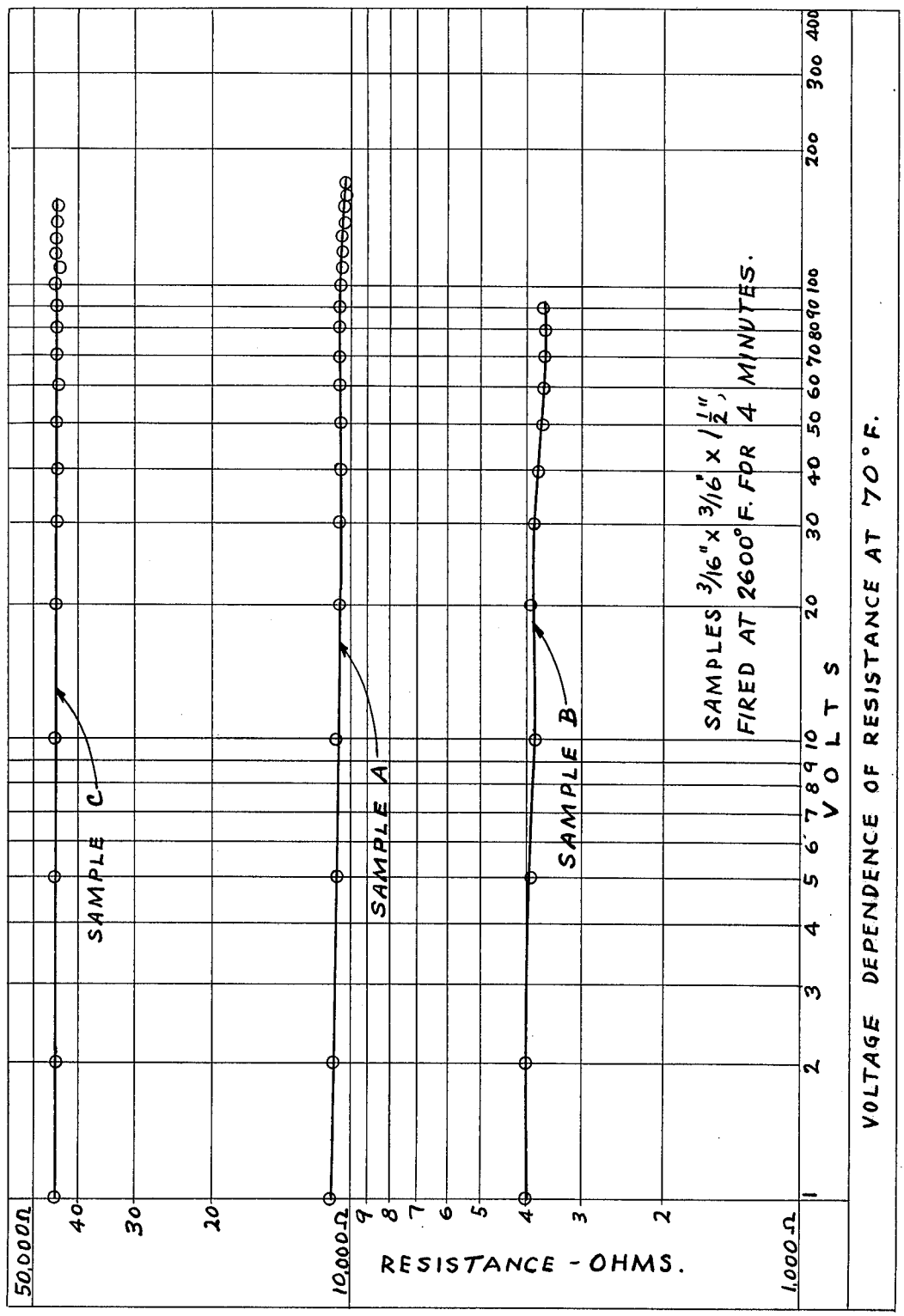

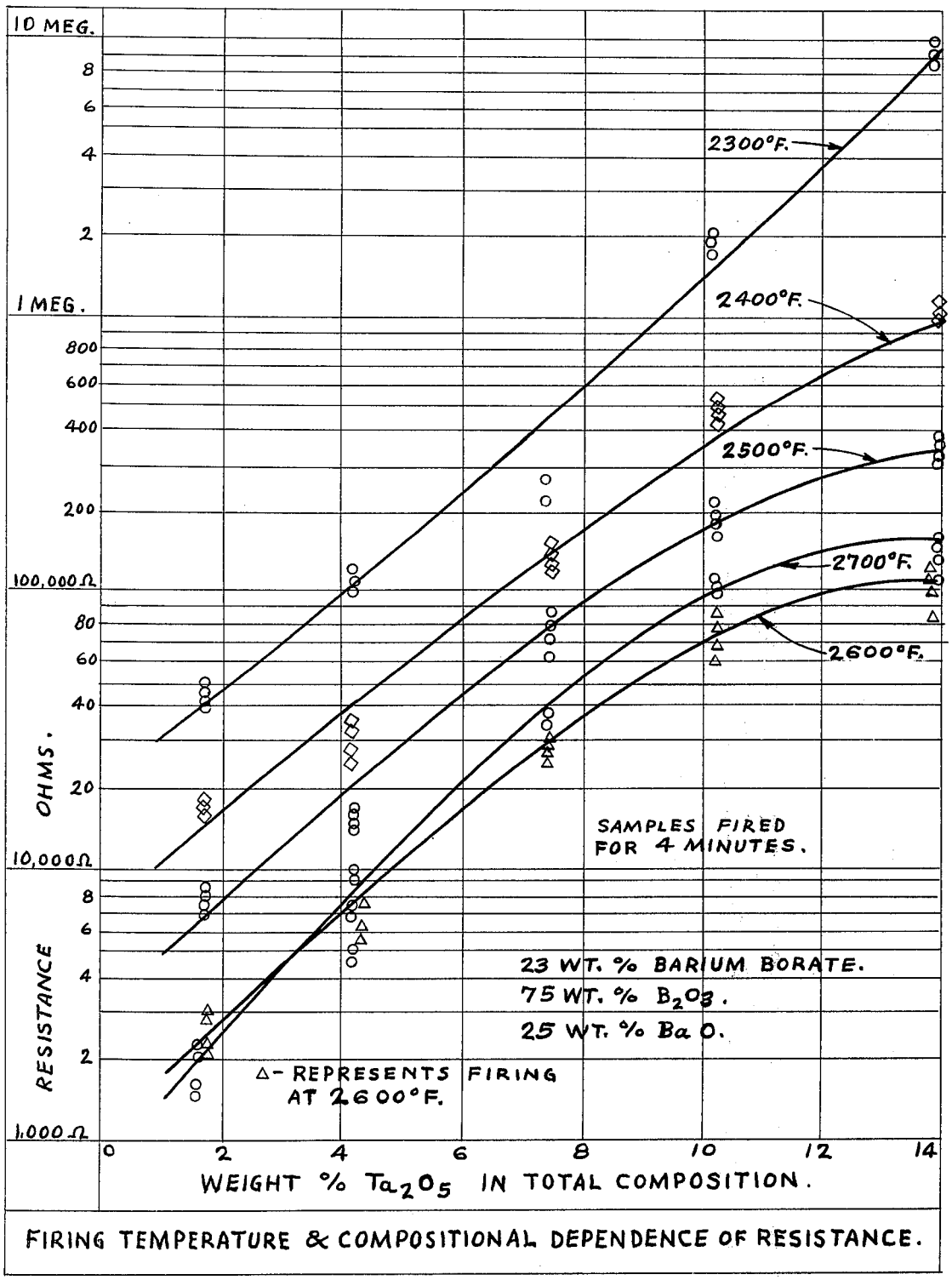
FIG-7-

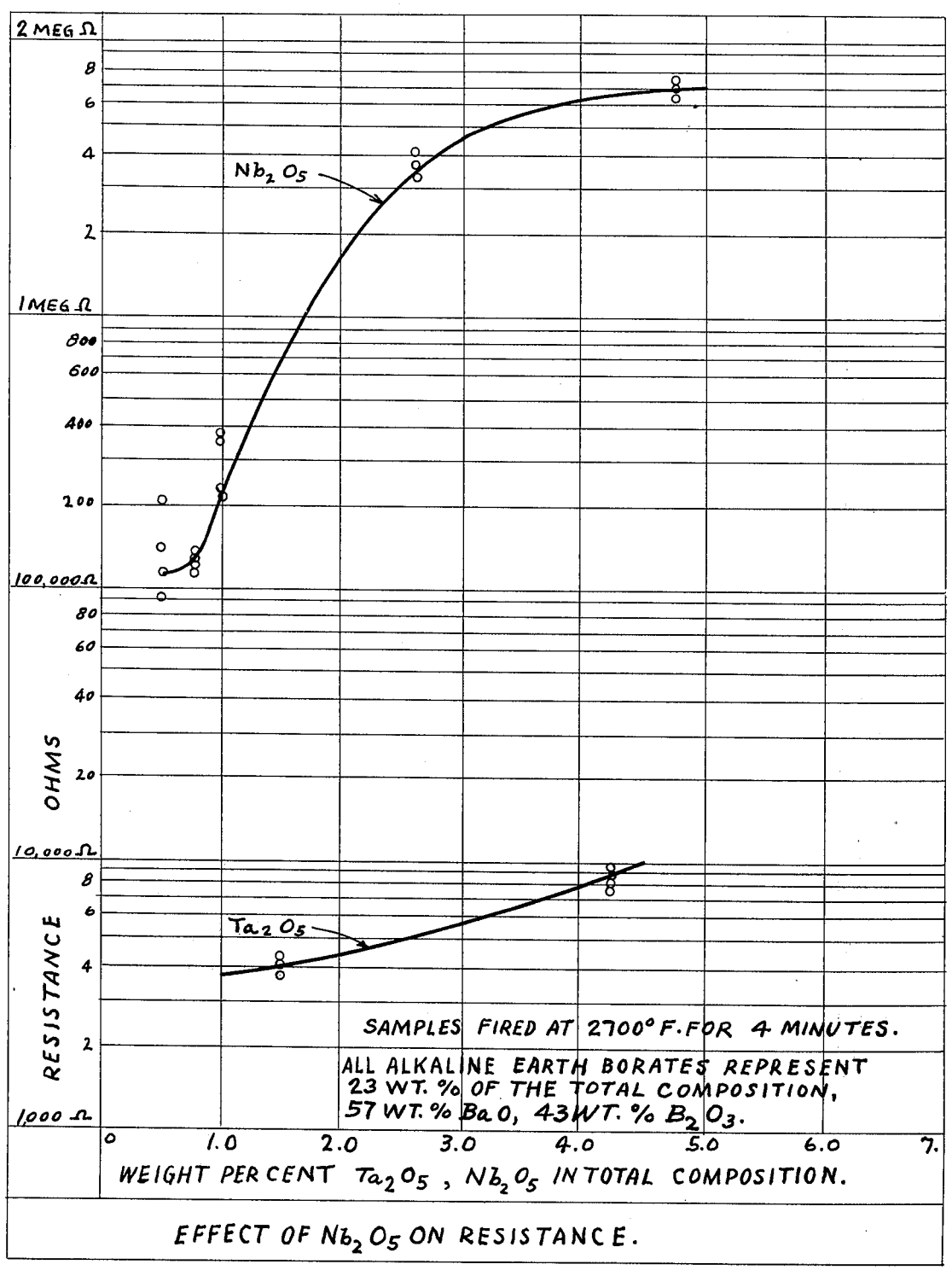
FIG-8-

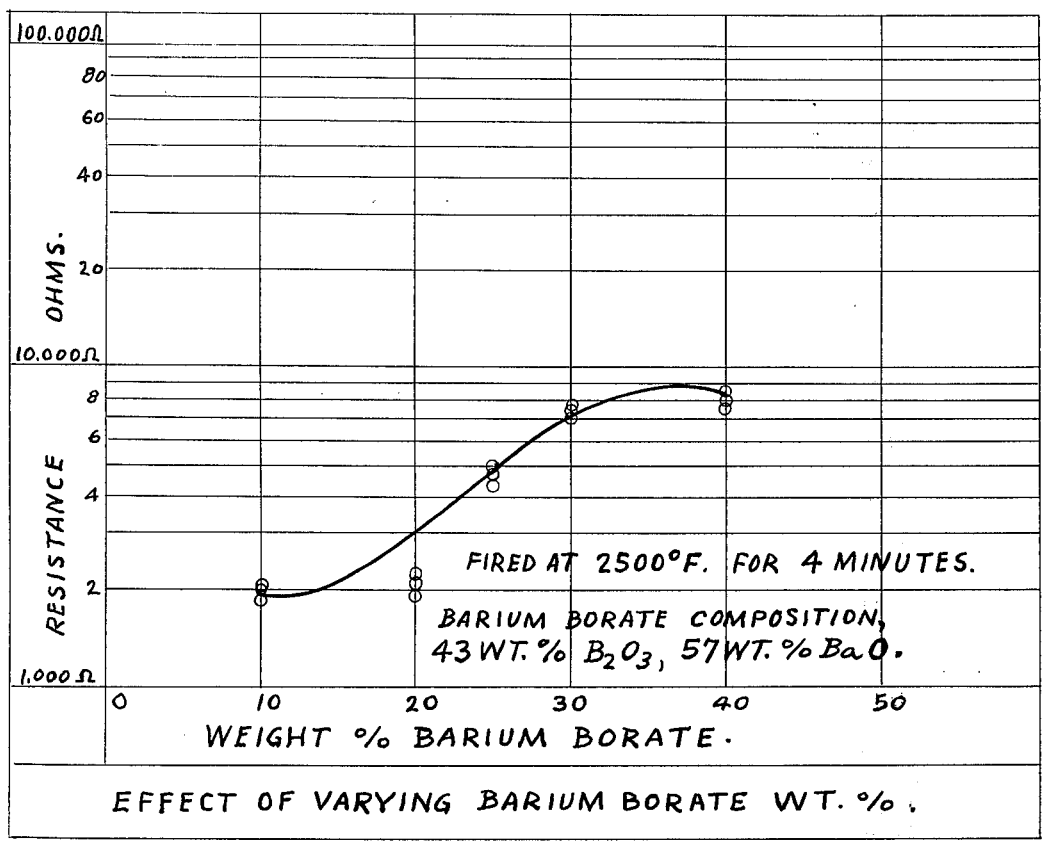
FIG-9-

TANTALUM OR NIOBIUM-MODIFIED RESISTOR ELEMENT

BACKGROUND OF THE INVENTION

This invention relates to a new and improved resistor element for use at elevated temperatures.

Resistor elements suitable for use in spark plugs must have good mechanical and electrical stability at high temperatures, a wide operating temperature range, uniform resistance values, and good suppression of high frequency oscillations associated with spark discharge in ignition systems.

Prior art resistor compositions consisting of carbon or graphite dispersed in a resinous binder are inexpensive, but have a limited temperature range and a high voltage coefficient of resistance. Vitreous type carbon resistor elements, formed from clay, talc and a refractory material having carbon distributed therein, have been used extensively. However, it is difficult to prepare such resistors having uniform resistance values. In an attempt to overcome difficulties encountered with the use of carbon, other resistor composition systems have been suggested. For example, U.S. Pat. Nos. 2,864,773 and 2,969,582 disclose the use of titanate and stanno-titanate type materials modified to obtain desired electrical characteristics.

SUMMARY OF THE INVENTION

The instant invention is based upon the discovery that a semiconductor of stannic oxide, alkaline earth borate doped with tantalum pentoxide or niobium pentoxide performs well as a resistor element. The stannic oxide resistor element contains from 1 to 18 percent tantalum pentoxide or ½ to 5 percent niobium pentoxide, dry basis, of the total batch weight. The total barium, calcium or strontium borate present, calculated as CaO, BaO or SrO respectively, ranges from 1 to 26 weight percent. The total boron content, calculated as $B_2O_3$ ranges from 4 to 25 percent. The total silica, calculated as $SiO_2$ ranges from ¼ to 4 percent. Up to 10 percent by weight of clay including the silica, may be present. The composition is pressed into a desired shape and fired to form the resistor element.

It is therefore an object of the present invention to provide a resistor composition that has a high temperature stability.

It is a further object of the present invention to provide a resistor composition that has low thermal and voltage coefficients of resistance.

It is a still further object of the present invention to provide a resistor composition that is capable of suppressing unwanted radio frequency oscillations.

Other objects and advantages of the invention will become apparent from the following detailed description.

BRIEF DESCRIPTION OF THE DRAWINGS

FIG. 1 is a representation of the curve obtained from the measurement of resistance of a series of $Ta_2O_5$-doped stannic oxide-barium borate resistor elements showing the effect of varying amounts of $Ta_2O_5$ present;

FIG. 2 is a representation of the curves obtained from the measurement of resistance of a series of $Ta_2O_5$-doped stannic oxide-barium borate resistor elements showing the effect of altering the ratio of BaO to $B_2O_3$;

FIG. 3 is a representation of the curves obtained from the measurement of resistance of a series of $Ta_2O_5$-doped stannic oxide-barium, calcium, and strontium borate resistor elements;

FIG. 4 is a representation of the curve obtained from the measurement of resistance of a series of $Ta_2O_5$-doped stannic oxide-barium borate resistor elements showing the effect of varying amounts of kaolin;

FIG. 5 is a representation of the curves obtained from the measurement of resistance at varying temperatures, of a series of $Ta_2O_5$-doped stannic oxide-barium borate resistor elements;

FIG. 6 is a representation of the curves obtained from the measurement of the resistance of a series of $Ta_2O_5$-doped stannic oxide-barium resistor elements at varying voltages;

FIG. 7 is a representation of the curves obtained from the measurement of the resistance of a series of $Ta_2O_5$-doped stannic oxide-barium borate resistor elements showing the effect of varying firing temperatures;

FIG. 8 is a representation of the curves obtained from the measurement of resistance of a series of $Nb_2O_5$-doped stannic oxide-barium borate resistor elements and $Ta_2O_5$-doped stannic oxide-barium borate resistor elements; and FIG. 9 is a representation of the curves obtained from the measurement of resistance of a series of $Ta_2O_5$-doped stannic oxide-barium borate resistor elements showing the effect of varying the stannic oxide-barium borate ratio.

DESCRIPTION OF THE PREFERRED EMBODIMENT

EXAMPLE I

A series of resistor elements designated as Samples A through E, was prepared by weighing out 300–500 g. batches having the following compositions:

TABLE I

| Sample | SnO$_2$ | Ta$_2$O$_5$ | Barium Borate (43 Percent B$_2$O$_3$) | SiO$_2$ |
|---|---|---|---|---|
| A | 73.8 | 1.7 | 22.3 | 2.2 |
| B | 71.2 | 4.3 | 22.3 | 2.2 |
| C | 68.2 | 7.4 | 22.3 | 2.1 |
| D | 65.4 | 10.3 | 22.3 | 2.0 |
| E | 61.7 | 14.0 | 22.3 | 2.0 |

WEIGHT PERCENT-TOTAL BODY

FIG. 1 shows the measurements of resistance of samples A through E. By controlling the amount of tantalum present, the processing variables, and the resistor dimensions, a resistor element having desired electrical properties can be obtained.

The fact that crystalline phases incorporating $B_2O_3$ are not present in significant amounts suggests that it is incorporated in a vitreous glassy phase that is amorphous to X-rays. The presence of a glassy phase is also indicated by an increase in X-ray background at low diffraction angles.

A calcium or strontium borate glassy matrix can be formed from calcium or strontium oxide and boric oxide for use in the present invention. The glassy matrix may be partly present as a vitreous phase in a manner similar to the barium borate discussed earlier. FIG. 3 shows that the resistance values decrease as the ionic radii of the alkaline earth elements increases, i.e., in the order calcium, strontium, barium.

Sample A, containing the lowest concentration of $Ta_2O_5$, was tested to determine the influence of impurities by addition of kaolin to the batch ingredients. As shown in FIG. 4, increasing the kaolin concentration caused a logarithmic increase in resistance. Similar increases in resistance in Samples B, C, and D were caused by addition of one-half percent by weight of kaolin. Thus the resistor elements tolerate a large amount of impurities without a drastic or sudden increase in resistance.

Temperature stability and voltage stability are important properties of resistor elements. When resistance was measured at 500° F., it was found that the resistor element retained about 60 percent of the resistance obtained at 70° F.

FIG. 5 shows the effect of temperature on the resistance values of compositions designated in Example I as A, B, C and E. The temperature coefficient of resistance in percent and ppm per degree centigrade for the samples is listed in Table II.

measurements showed that the $Ta_2O_5$-doped resistor elements were effective in suppressing undesirable radio frequency radiation in the 70–80 megahertz range.

Since the elements in a given chemical group have similar chemical properties, the oxides of the other members of the VB chemical group, which include vanadium and niobium, were tested as substitutes for the tantalum oxide.

EXAMPLE II

The effect of substituting $Nb_2O_5$ for $Ta_2O_5$ in the resistor composition is shown in FIG. 8. As seen from FIG. 8, the resistance of a given stannic oxide-barium borate composition increases drastically when the composition is niobium doped as compared with a tantalum doped resistor. The useful range of a niobium-doped resistor was found to be from about ½ to 5 percent by

TABLE II

| | | | Temperature Coefficient of Resistance | | | |
|---|---|---|---|---|---|---|
| Sample | $Ta_2O_5$ | Resistor | Percent of Room Temperature Resistance Retained at 390° F (Meas. at 4.0 V) | Temp. Coeff. ppm/° C; 24 to 200° C (Meas. at 4.0 V) | Percent of Room Temperature Resistance Retained at 390° F (Meas. at 32.0 V) | Temp. Coeff. ppm/° C; 24 to 200° C (Meas. at 32.0 V) |
| A | 1.7 | 1 | 37 | −35,800 | 47 | −36,100 |
| A | 1.7 | 2 | 41 | −33,500 | 53 | −26,700 |
| A | 1.7 | 3 | 43 | −32,400 | 47 | −30,100 |
| A | 1.7 | 4 | 44 | −32,800 | 48 | −99,500 |
| B | 4.3 | 1 | 54 | −26,100 | 62 | −21,600 |
| B | 4.3 | 2 | 60 | −22,700 | 64 | −26,500 |
| B | 4.3 | 3 | 51 | −27,800 | 62 | −21,600 |
| B | 4.3 | 4 | 57 | −24,400 | 61 | −22,200 |
| C | 7.4 | 1 | 60 | −22,700 | 67 | −18,800 |
| C | 7.4 | 2 | 63 | −21,000 | 68 | −18,200 |
| C | 7.4 | 3 | 62 | −21,600 | 67 | −18,800 |
| C | 7.4 | 4 | 63 | −21,000 | 68 | −18,200 |
| D | 10.3 | 1 | 56 | −25,000 | 66 | −19,300 |
| D | 10.3 | 2 | 66 | −19,300 | 68 | −18,200 |
| D | 10.3 | 3 | 62 | −21,600 | 69 | −17,600 |
| D | 10.3 | 4 | 60 | −22,700 | 68 | −18,200 |
| E | 14.0 | 1 | 65 | −19,900 | 69 | −17,600 |
| E | 14.0 | 2 | 69 | −17,600 | 70 | −17,050 |
| E | 14.0 | 3 | 70 | −17,050 | 71 | −16,500 |
| E | 14.0 | 4 | 68 | −18,200 | 69 | −17,600 |

FIG. 6 shows that resistance of the tantalum doped resistor elements is independent of voltage up to 170 volts. Samples 1½ inches in length were tested using a steady state instead of a pulse voltage technique.

Although the resistivity of the resistor elements is a function of the composition of the elements, processing variables also influence the resistivity. In order to investigate this influence, resistor elements having compositions similar to those described in Table I were tested by varying the firing temperature and the pressing pressure.

FIG. 7 shows that as the firing temperature was increased from 2300° F to 2600° F., the resistance values obtained increased also. In the temperature range 2600°–2700° F. the resistance values changed only a slight amount and appear to be independent of the firing temperature. Above 2700° F. or for relatively long firing times at 2700° F., the resistance values again increased. The resistance of the samples was independent of the pressing pressure, in a range of 10,000–40,000 psi.

The resistor elements of the instant invention are suitable for use in resistor spark plugs of the automotive and aviation type. Such resistor spark plugs are used to reduce radio frequency interference and are particularly useful for reducing interference in the FM and shortwave frequency ranges. Spectrum analyzer weight niobium.

Substitution of $V_2O_5$ for $Ta_2O_5$ in the resistor element was not successful; the resistances produced were too high for the equipment to measure.

Antimony trioxide was attempted as a substitute for $Ta_2O_5$, however, very low resistance values in the range of 5 to 120 ohms were obtained. The resistance values did not appear to be dependent upon the amount of $Sb_2O_3$ present in the composition.

EXAMPLE III

In order to determine the effect of changing the barium borate-stannic oxide ratio, the amount of barium borate was varied from 10–40 percent by weight. The preferred composition of Sample B, in which the semiconductor body contained approximately 4 percent by weight of $Ta_2O_5$, was used. As shown in FIG. 9, the resistance values vary as a direct function of increase in the proportion of barium borate. Because the semiconductor body, i.e., the doped stannic oxide, imparts conductivity to the resistor element, such an increase in resistance due to a decrease in the proportion of semiconductor body present in the resistor element is not unexpected.

It will be appreciated from the foregoing discussion that by using the method of the instant invention, a resistor element having a desired value ranging from 1,000 to greater than 100,000 ohms can be obtained. This may be accomplished in several ways. For example, the composition of the resistor element can be varied within the limits disclosed. The semiconductor can be a tantalum or niobium-doped stannic oxide lattice in a glassy matrix of barium, calcium or strontium borate. Up to 3 percent by weight of silica and 10 percent by weight of clay including the silica, can be present. Obviously the desired resistance for any given composition can be varied by changing the dimensions of the resistor element. Further, as indicated, the processing conditions to which the resistor element is subjected also influences the resistance values obtained. By controlling the composition, dimensions and processing conditions, as disclosed and claimed, the instant invention enables the production of a resistor element having a desired resistance in the range of 1,000 to greater than 100,000 ohms.

What we claim is:

1. A green ceramic article useful after firing as an electrical resistor element which is a modified stannic oxide semi-conductor, said article consisting essentially of stannic oxide, a modifying oxide selected from the group consisting of tantalum pentoxide, and niobium pentoxide, a barium, calcium or strontium compound, a boron compound and silica, the amount of said modifying oxide, based on the total weight of the article, when tantalum pentoxide, ranging from 1 to 18 percent by weight and, when niobium pentoxide, ranging from ½ to 5 percent by weight, the total barium, calcium or strontium content of the article, calculated as CaO, BaO, or SrO respectively, ranging from 1 to 26 percent by weight, the total boron content of the article, calculated as $B_2O_3$, ranging from 4 to 25 percent by weight, and the total silica, calculated as $SiO_2$, ranging from ½ to 4 percent by weight wherein a plot of the resistance versus the amount of the modifying oxide present in the fired resistor has a positive slope as the tantalum pentoxide varies from 1 to 18 percent or as the niobium pentoxide varies from ½ to 5 percent by weight of the green ceramic article.

2. A green ceramic article as claimed in claim 1 having an electrical resistance after firing of a desired value from 1000 to greater than 100,000 ohms depending on composition, said article consisting essentially of from
   a. 50 to 94 percent by weight $SnO_2$, and
   b. 1 to 18 percent by weight $Ta_2O_5$, and
   c. 1 to 26 percent by weight BaO, CaO or SrO, and
   d. 4 to 25 percent by weight $B_2O_3$, and
   e. ½ to 4 percent by weight $SiO_2$, and
   f. up to 10 percent by weight clay including said silica.

3. A green ceramic article as claimed in claim 1 having an electrical resistance after firing of a desired value from 1000 to greater than 100,000 ohms depending on composition, said article consisting essentially of from
   a. 50 to 94 percent by weight $SnO_2$, and
   b. ½ to 5 percent by weight $Nb_2O_5$, and
   c. 1 to 26 percent by weight BaO, CaO or SrO, and
   d. 4 to 25 percent by weight $B_2O_3$, and
   e. ½ to 4 percent by weight $SiO_2$, and
   f. up to 10 percent by weight clay including said silica.

4. A green ceramic article as claimed in claim 1 consisting essentially of from
   a. 60 to 75 percent by weight $SnO_2$, and
   b. 1 to 14 percent by weight $Ta_2O_5$, and
   c. 12 to 13 percent by weight BaO, CaO or SrO, and
   d. 9 to 10 percent by weight $B_2O_3$, and
   e. up to 3 percent by weight $SiO_2$.

5. A green ceramic article as claimed in claim 1 having an electrical resistance after firing of a desired value between 2000 and 6000 ohms, consisting of about
   a. 73.8 percent by weight $SnO_2$, and
   b. 1.7 percent by weight $Ta_2O_5$, and
   c. 12.7 percent by weight BaO, and
   d. 9.6 percent by weight $B_2O_3$, and
   e. 2.2 percent $SiO_2$.

6. A green ceramic article as claimed in claim 1 having an electrical resistance after firing of a desired value between 4000 and 12,000 ohms, consisting of about
   a. 71.2 percent by weight $SnO_2$, and
   b. 4.3 percent by weight $Ta_2O_5$, and
   c. 12.7 percent by weight BaO, and
   d. 9.6 percent by weight $B_2O_3$, and
   e. 2.2 percent $SiO_2$.

7. A method for producing a sintered electrical resistor element, said method comprising the steps of preparing a batch which is a uniform mixture of finely divided particles, said batch consisting essentially of stannic oxide, a modifying oxide selected from the group consisting of tantalum pentoxide and niobium pentoxides, a barium, calcium or strontium compound, a boron compound and silica, the amount of said modifying oxide, based on the total weight of the batch, when tantalum pentoxide, ranging from 1 to 18 percent by weight and, when niobium pentoxide, ranging from ½ to 5 percent by weight, the total barium, calcium or strontium content, calculated as CaO, BaO or SrO respectively, ranging from 1 to 26 percent by weight, the total boron content of the batch, calculated as $B_2O_3$, ranging from 4 to 25 percent by weight, and up to 4 percent by weight silica, based upon the total weight of the batch, pressing a shape from the batch at a pressure of about 10,000 to 40,000 pounds per square inch, and firing the shape to a temperature within the range of about 2300°–2700° F. for a time sufficient to form said resistor element.

* * * * *